US011727151B2

(12) United States Patent
Pandit et al.

(10) Patent No.: US 11,727,151 B2
(45) Date of Patent: Aug. 15, 2023

(54) PSEUDONYMIZING SENSITIVE OBJECTS IN ONLINE CONTENT EXCHANGES (71) Applicant: International Business Machines Corporation, Armonk, NY (US)

(72) Inventors: Sushain Pandit, Austin, TX (US); Qin Qiong Zhang, Beijing (CN); Su Liu, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 47 days.

(21) Appl. No.: 16/807,484

(22) Filed: Mar. 3, 2020

(65) Prior Publication Data

US 2021/0279370 A1 Sep. 9, 2021

(51) Int. Cl.
G06F 21/62 (2013.01)
(52) U.S. Cl.
CPC ................. G06F 21/6263 (2013.01)
(58) Field of Classification Search
CPC .......... G06F 21/6263; H04L 2209/04
See application file for complete search history.

(56) References Cited

U.S. PATENT DOCUMENTS

| 6,823,203 | B2 | 11/2004 | Jordan |
| 7,363,361 | B2 | 4/2008 | Tewari |
| 8,127,365 | B1 | 2/2012 | Liu |
| 8,214,363 | B2 | 7/2012 | Chaudhary |
| 9,087,216 | B2 | 7/2015 | Lafever |
| 9,894,076 | B2* | 2/2018 | Li ................. H04L 63/102 |
| 10,135,836 | B2 | 11/2018 | Chan |
| 10,193,844 | B1* | 1/2019 | Conley ............. H04L 51/12 |
| 10,382,620 | B1* | 8/2019 | Allen ............... G06F 21/602 |
| 10,521,610 | B1* | 12/2019 | Ledet ............... H04L 9/3226 |

(Continued)

FOREIGN PATENT DOCUMENTS

| CN | 103095530 B | 9/2016 | |
| EP | 2036306 A2 * | 3/2009 | .......... H04L 63/102 |

OTHER PUBLICATIONS

"Contextual Clues for Named Entity Recognition in Japanese", © 2002-2011, The CJK Dictionary Institute, Inc., 4 pps., <http://www.cjk.org/cjk/samples/necc.htm>.

(Continued)

*Primary Examiner* — Saleh Najjar
*Assistant Examiner* — Devin E Almeida
(74) *Attorney, Agent, or Firm* — Aaron N. Pontikos (57) ABSTRACT A method for protecting content of online conversational content. The method provides for scanning content of an online conversational exchange between a first device and a second device. A sensitive object included in the content of the online conversation exchange is identified, based on object type information accessible from a protection policy included in respective user profiles. A pseudonymized-object-holder is assigned to the identified sensitive object according to the protection policy of the respective user profiles, and the identified sensitive object identified in the content of the online conversation exchange and stored on both the first device and the second device is replaced with a pseudonymized-object-holder, based on the sensitive-object protection policy of the respective user profiles.

20 Claims, 5 Drawing Sheets

(56) References Cited

U.S. PATENT DOCUMENTS

| | | | | |
|---|---|---|---|---|
| 2009/0172408 | A1* | 7/2009 | Cheng | G06F 21/84 |
| | | | | 726/1 |
| 2010/0024042 | A1* | 1/2010 | Motahari | G06Q 10/10 |
| | | | | 726/26 |
| 2012/0324547 | A1* | 12/2012 | Vidal | H04L 63/083 |
| | | | | 726/4 |
| 2013/0117281 | A1 | 5/2013 | Fleet | |
| 2015/0118992 | A1* | 4/2015 | Wyatt | H04W 12/02 |
| | | | | 455/410 |
| 2015/0163206 | A1* | 6/2015 | McCarthy | H04L 63/104 |
| | | | | 726/4 |
| 2015/0199538 | A1* | 7/2015 | Kritt | G06F 21/6245 |
| | | | | 726/26 |
| 2015/0310188 | A1* | 10/2015 | Ford | H04L 63/0428 |
| | | | | 726/28 |
| 2016/0148014 | A1* | 5/2016 | Peterson | H04L 51/22 |
| | | | | 726/28 |
| 2017/0048275 | A1* | 2/2017 | John | G06F 21/6227 |
| 2017/0104756 | A1 | 4/2017 | Rosenthal | |
| 2017/0132186 | A1* | 5/2017 | Plummer | G06F 21/10 |
| 2018/0332008 | A1 | 11/2018 | Norman | |
| 2019/0180054 | A1* | 6/2019 | Barday | G06F 21/552 |
| 2020/0104539 | A1* | 4/2020 | Liu | G06F 21/6245 |
| 2021/0243595 | A1* | 8/2021 | Buck | H04W 12/08 |

OTHER PUBLICATIONS

"Protected Health Information (HIPAA)", Sensitive Data Guide, 4 pps., Downloaded from the Internet on Jan. 3, 2020, <https://safecomputing.umich.edu/dataguide/?q=node/61>.

"Quick Reference Guide for NDSU Data Classification", 3 pps., Downloaded from the Internet on Jan. 3, 2020, <https://www.ndsu.edu/fileadmin/www.its.ndsu.edu/security/SSN/Quick_Reference_Guide_for_NDSU_Data_Classification.pdf>.

"Your Name in Chinese—Calligraphy, pronunciation, tattoo", Copyright © 2020 VerticalScope Inc. All Rights Reserved, 2 pps., <https://www.chinese-tools.com/names/search.html>.

Gurses, "Can you engineer privacy? On the potentials and challenges of applying privacy research in engineering practice", Communications of the ACM 57.8, Aug. 14, 2014, 6 pps.

Sokol et al., "Deploying Honeypots and Honeynets: Issue of Privacy", 2015, 10th International Conference on Availability, Reliability and Security, IEEE, pp. 397-403.

Squicciarini et al., "Preventing information leakage from indexing in the cloud." 2010 IEEE 3rd International Conference on Cloud Computing. IEEE, 2010.

\* cited by examiner

FIG. 1

| SENSITIVE-OBJECT TYPE | DATA CLASSIFICATION | RETENTION PERIOD |
|---|---|---|
| NAME & ( ) | RESTRICTED | 30 MINUTES + CONTEXT |
| SOCIAL SECURITY NUMBER | RESTRICTED | 10 MINUTES + CONTEXT |
| DRIVER'S LICENCE NUMBER | RESTRICTED | 30 MINUTES + CONTEXT |
| FINANCIAL ACCOUNTS | RESTRICTED | 15 MINUTES + CONTEXT |
| DEBIT OR CREDIT CARD NUMBER | RESTRICTED | 12 HOURS + CONTEXT |
| HEALTH INFORMATION (PHI) | RESTRICTED | 1 DAY |
| BIRTH DATE | PRIVATE | 3 DAYS |
| LOCATION DATA | PRIVATE | 1 WEEK |
| EDUCATION RECORD INFORMATION | PRIVATE | 1 MONTH |
| OTHER IDENTIFYING NUMBERS | PRIVATE | 1 MONTH |

PSEUDONYMIZING SENSITIVE OBJECTS IN ONLINE CONTENT EXCHANGES

FIELD OF THE INVENTION

The present invention relates generally to the field of electronic device security, and more particularly to securing sensitive content in peer to peer online text conversations.

BACKGROUND OF THE INVENTION

Online text communication continues to experience adoption and growth of participation. Although many text-based platforms exist, peer-to-peer (P2P) communication continues to gain popularity. Peer-to-peer communication includes encryption of content between communicating devices, which provides a level of security of content exchange while in transit and leaves little useful content to be reviewed or scraped on the cache of supporting routers or servers. Some P2P transaction applications (apps) perform transactions, such as electronic payment or money transfers.

Popular online chat system apps, such as "WhatsApp"® and "WeChat"®, connect two (sometime more) individuals through an Internet connection and enable text communication sessions ("WhatsApp" is a registered trademark of WhatsApp Inc. in the United States and other countries worldwide; "WeChat" is a registered trademark of Tencent Holdings Limited in the United States and other countries worldwide). In some countries and geographies, certain content information exchanged via electronic communication is required to be removed once the session or transaction has ended, which is enforced on the intermediary supporting platform infrastructure. For example, under the General Data Protection Regulations (GDPR) or the European Union, data controllers and processors are obliged to return or delete all personal data after the end of services or on expiration of a contract or agreement, unless otherwise required by law.

SUMMARY

Embodiments of the present invention disclose a method, computer program product, and system. The embodiments include a method for protecting content of an online conversational exchange, the method providing for one or more processors to scan content of an online conversation exchange between a first device and a second device. The one or more processors identify a sensitive object included in the content of the online conversation exchange, based on types of sensitive-object information accessible from a sensitive-object protection policy included in respective user profiles of the first device and the second device. The one or more processors assign a pseudonymized-object-holder to the identified sensitive object according to the sensitive-object protection policy of the respective user profiles, and the one or more processors replace the identified sensitive object in the content of the online conversation exchange between the first device and the second device, stored on both the first device and the second device, with the pseudonymized-object-holder, based on the sensitive-object protection policy of the respective user profiles.

DETAILED DESCRIPTION

Embodiments of the present invention recognize that peer-to-peer (P2P) chat systems enable text-based communications (and potentially audio and video communications) between users and can result in copies of content exchanged between the users remaining on each user's respective device. Embodiments further recognize that practical and effective enforcement of privacy regulations, which may vary between geographies and countries, as well as retention preferences of users, are no longer under the sender's control once the content is sent. Embodiments also recognize that effective privacy protection enforcement requires customization dependent on a user's location and preferences. Embodiments of the present invention recognize that the content of peer-to-peer conversations remains unedited on the user's personal devices, and one user cannot control the retention actions of the other user, potentially exposing sensitive object data from the content exchanged.

Embodiments of the present invention disclose a method, computer program product, and computer system of contextual data management of chat systems protecting sensitive-object data included in online content exchanged via peer-to-peer chat sessions. Embodiments of the present invention include the performance of protective actions on each respective user of an online conversational exchange. Embodiments include applying a pseudonymization action as a protective measure of sensitive objects identified in the online exchange in which a substitution is made for the sensitive objects as an edit to the original content exchanged. Pseudonymization is a data management and de-identification procedure by which personally identifiable information fields, sensitive information, protected information, or secret information within a data record are replaced by one or more artificial identifiers or pseudonyms.

Embodiments of the present invention identify personal, private, and secret entities within an online text-based conversational exchange referred to herein as sensitive objects. In some embodiments, sensitive objects are defined by the repetitive selection of terms within multiple content samples and assigning the selected terms to defined sensitive-object types. Sensitive-object types define a grouping classification of sensitive objects and can be set and edited by an administrative role for restricted classes of sensitive objects in compliance with legal and/or other recognized authorities (e.g., employer). Examples of restricted sensitive-object types may include but are not limited to social security number, driver's license number, passport number, financial account number, debit or credit card number, protected health information (PHI), and business confidential items.

Restricted type sensitive objects may include combinations of sensitive objects that connect to or identify an individual, such as a combination of name and account number. In some embodiments, users augment sensitive-object types by adding private or personal classifications that may include, for example, but not limited to: birth date, birth location, address, email address, education record information, family member names, passwords and passcodes, user identification (ID), employee ID, and other identifying or connecting information.

Embodiments of the present invention apply sensitive-object protection policies as guidance for the performance of pseudonymization of sensitive objects identified in scanned online conversational content exchanges. Sensitive-object protection policies provide a reference to identify, select, and replace sensitive objects in content exchanges. Sensitive-object protection policies include classification types, retention rate or period, and pseudonymized-object-holders assigned to the identified sensitive-object types. Sensitive-object protection policies may be a set of policies from government or other authority and from user-customized criteria saved to the user's profile.

Sensitive-object protection policies include a retention rate or retention period defining a duration in which the sensitive object remains in the original content of peer-to-peer exchange. Subsequent to the expiration of the retention period designated within the sensitive-object policy, pseudonymization of the sensitive object is performed by replacing the sensitive object with a designated replacement term, referred herein as a pseudonymized-object-holder, assigned to the particular sensitive-object type.

In some embodiments of the present invention, sensitive-object protection policies include the use of pseudonymization rations in which incremental changes to an online conversational content exchange are made to identified sensitive objects as a function of time and aligned with the retention period designated for sensitive-object types in the policies. For example, a scanned content exchange may include ten identified sensitive objects. In some embodiments, pseudonymization changes may occur in 10% increments for ten increments of time, resulting in a percentage of change (ration) to the content exchange per period of time. In some embodiments, a protection policy may include multiple levels of sensitive-object types in which certain customization of sensitive-object types may be permitted. For example, restricted classification sensitive-object types may be defined by a government or other authority as well as by users customizing their respective profiles, creating multiple levels of classification types and retention periods.

In some embodiments, sensitive-object policies include pseudonymized-object-holders, which are a set of replacement terms aligned with a sensitive-object type and defined by an administrator or user customization for respective classification levels. Pseudonymized-object-holders are assigned to sensitive-object types and replace sensitive objects identified within content exchanges during pseudonymization activity. In some embodiments, a pseudonymized-object-holder is explicitly prescribed, such as a series of characters that do not offer a particular meaning. In other embodiments, the pseudonymized-object-holder is a generic term or randomized set of characters. In yet other embodiments, the pseudonymized-object-holder is selected from pre-defined lists of pseudonyms.

In some embodiments of the present invention, identification of a sensitive object includes determining contextual information associated with the use of the sensitive-object term in the content exchange. Contextual information may include determining a time zone in which a user participating in the peer-to-peer content exchange is located. The information included in the content exchange may require a waiting period until the information can be used, and sensitive-object protection policies may include contextual consideration rules based on the determined context to which the sensitive object applies. For example, a transaction that requires information from a first user to be used by a second user may only be performed within designated "business hours". Contextual information of the current time for the second user may be used by the sensitive-object protection policy to modify the retention period of an account number of the first user.

In another example, the content surrounding the account information of the first user sent to the second user may indicate that information was received and used, which may prompt the sensitive-object protection policy to initiate pseudonymization of the account number. Other contextual information determined within the scanning of the content exchange by application of natural language processing (NLP) techniques and semantic analysis of the content, may result in an adjustment to retention periods designated for classification types, and the examples are presented to further clarify embodiments of the present invention, without indicating limitation.

In some embodiments, online text-based content is scanned to identify content objects of the exchange, based on NLP and semantic analysis. Embodiments identify sensitive objects within the exchanged content, determining a type of sensitive object based on the training of identification modules with labeled sensitive objects from online content samples and on-going learning. In some embodiments, sensitive-object types are defined by regulations corresponding to a location of a user, such as a country or geography, and may be augmented with sensitive-object types identified by user input as part of a user profile. The sensitive-object type information is included in privacy protection policies that are associated with a user's device, and from which protective actions are performed on respective users participating in an online peer-to-peer conversational exchange. In some embodiments, the sensitive object is replaced within the retained content of the exchange with another user, with a pseudonymized object-holder.

In some embodiments, sensitive object types may be defined and included in protection policies sensitive-object types based on business, technical, legal or other protective needs. In some embodiments, if protection policies differ between the exchanging users, the more protective policy takes precedent and is applied, based on retention rate information of the more protective policy. For example, if a first user's policy does not include any actions to be taken for an address included in a conversational exchange, but a second user's policy identifies an address as a sensitive object and requires pseudonymization with a retention within the message of three days, then the second user's policy is applied to the content exchanged between the first user and the second user, identifying and pseudonymizing the address after a three day retention period.

Figure 1:
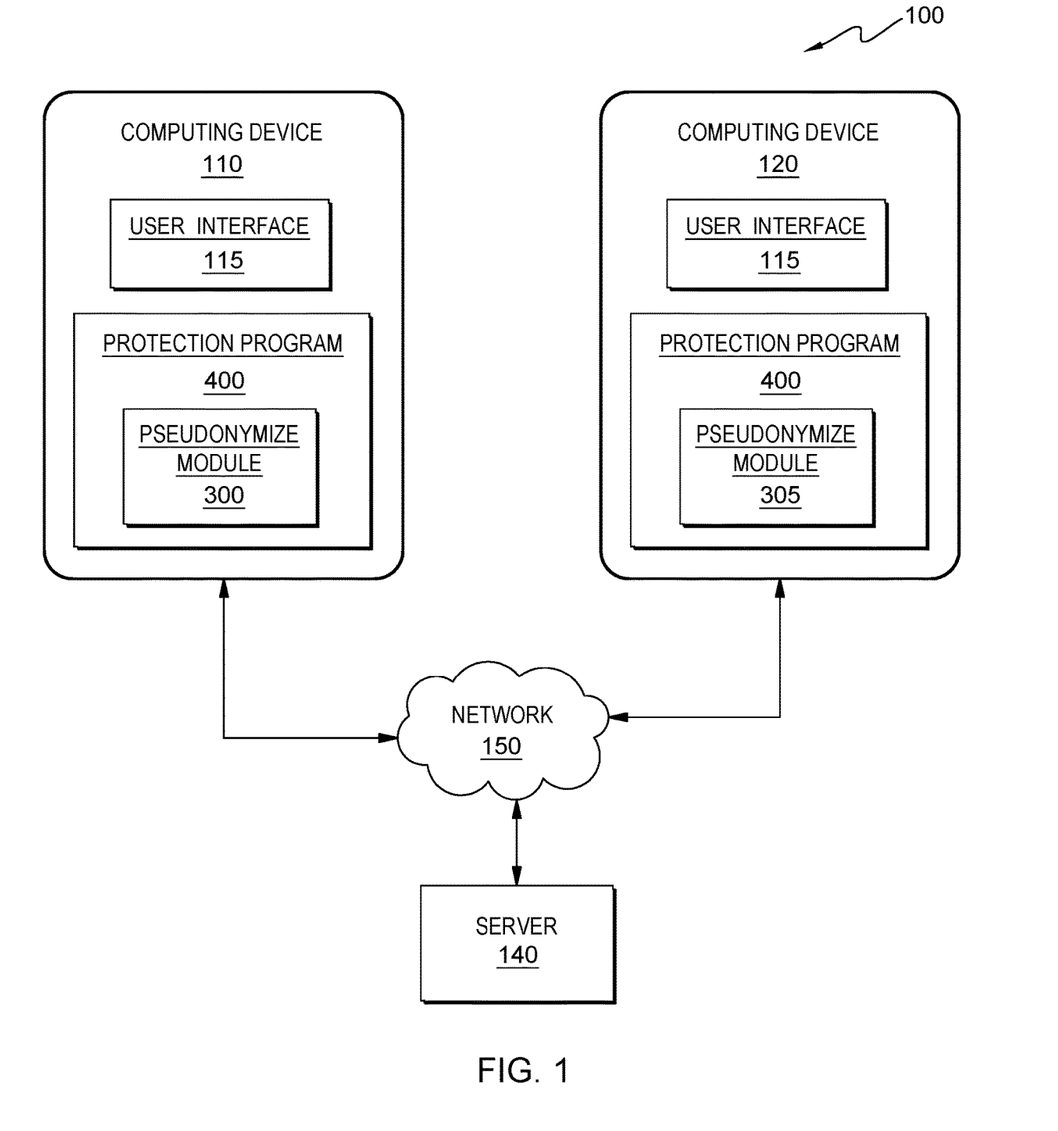
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110, computing device 120, and server 140, all interconnected via network 150.

Network 150 can be, for example, a local area network (LAN), a wide area network (WAN), such as the Internet, a virtual local area network (VLAN), or any combination that can include wired, wireless, or optical connections. In general, network 150 can be any combination of connections and protocols that will support communications between computing device 110, computing device 120, protection program 400, with respective versions operating on computing device 110 and computing device 120, and server 140, in accordance with embodiments of the present invention.

Computing device 110 includes user interface 115, pseudonymize module 300 and protection program 400. Computing device 120 similarly includes user interface 115 and protection program 400 but includes pseudonymize module 305 which may be distinct from pseudonymize module 300 due to differences in location-specific and user-based sensitive-object protection policy information.

In some embodiments, computing device 110 and/or computing device 120 can be a standalone mobile computing device, a smartphone, a tablet computer, a smartwatch, a laptop computer, or other electronic device or computing system capable of receiving, sending, and processing data. In other embodiments, computing device 110 and/or computing device 120 can be a computing device interacting with applications and services hosted and operating in a cloud computing environment. In another embodiment, computing device 110 and/or computing device 120 can be a netbook computer, a desktop computer, a personal digital assistant (PDA), or another programmable electronic device capable of receiving programming instructions from protection program 400 hosted respectively on computing device 110 and computing device 120, or communicatively connected to protection program 400 operating remotely, such as on server 140. Computing device 110 and computer device 120 may include internal and external hardware components, depicted in more detail in FIG. 5.

User interface 115 provides an interface to access features and functions of computing device 110. In some embodiments of the present invention, user interface 115 provides access to protection program 400, operating on computing device 110. User interface 115 also supports access to other applications, features, and functions of computing device 110 (not shown). User interface 115 displays the content exchanged between users of computing devices 110 and 120 operating peer-to-peer apps sending and receiving online conversational content. User interface 115 displays pseudonymizations performed on the conversational content exchanged between users consistent with the sensitive-object types and retention periods included in a participating user's respective protection policies.

User interface 115 supports access to alerts, notifications, and provides forms of communications. In one embodiment, user interface 115 may be a graphical user interface (GUI) or a web user interface (WUI) and can receive user input and display text, documents, web browser windows, user options, application interfaces, and instructions for operation, and include the information (such as graphic, text, and sound) that a program presents to a user and the control sequences the user employs to control the program. In another embodiment, user interface 115 may also be mobile application software that provides an interface to features and functions of computing device 110 and computing device 120. User interface 115 enables a user of computing device 110 and computing device 120 to receive, view, hear, and respond to input, access applications, display content of online conversational exchanges, and perform available functions.

Protection program 400 is depicted as hosted and operating on both computing device 110 and computing device 120. Protection program 400 scans online peer-to-peer conversational exchanges between users and identifies sensitive objects, based on sensitive-object types included in protection policies of the users participating in the content exchange. Protection program 400 determines the retention period associated with the sensitive-object type and determines whether contextual information applies to the sensitive object, based on factors such as, but not limited to, the additional content of the exchange, the location of the participating users, and the timestamp of the content exchange.

Protection program 400 applies the assigned pseudonymized-object-holders to replace the corresponding sensitive objects, based on the retention period as designated in the sensitive-object protection policies of the user. In some embodiments, the information included in the protection policies is maintained on computing devices 110 and 120. In other embodiments, protection program 400 is communicatively connected to the sensitive-object protection policies residing external to computing devices 110 and 120, and protection program 400 accesses the respective protection policies, for example, accessing the protection policies of both computing device 110 and computing device 120 maintained on server 140. Protection program 400 replaces the sensitive objects identified in the content exchange with pseudonymized-object-holders according to the retention period and context determined.

In some embodiments of the present invention, protection program 400 operates on respective users' devices and may include distinct sensitive-object protective policies, which are generated and maintained in pseudonymize module 300 of computing device 110, and pseudonymize module 305 of computing device 120. The pseudonymize modules may include non-identical protection policies due to different location and user-based sensitive-object types and retention periods. For online conversational content exchanges between users having different sensitive-object protection policies, the more secure policy, having shorter retention periods, takes precedence.

Pseudonymize module 300 and pseudonymize module 305 receive location-specific sensitive-object type classification and retention period information, as well as the user-based sensitive-object type and retention information. Because computing device 110 and computing device 120 may be in locations having distinct regulations and preferences, and classification of sensitive objects may be represented differently in respective protection policies. Pseudonymize module 300 and pseudonymize module 305 include training to identify sensitive-object types from scanned content exchanges between peer-to-peer user conversations. Training is accomplished by labeling example content exchanges identifying types of sensitive objects and identifying additional text within example content exchanges providing context to the sensitive objects. Machine learning techniques are applied and pseudonymize module 300 and pseudonymize module 305 are continually updated and improved by receipt of feedback from users and administrators regarding pseudonymization applied to sensitive objects of content exchanges. Pseudonymize module 300 and pseudonymize module 305 includes assigning pseudonymized-object-holders to sensitive-object types. In some embodiments, the pseudonymized-object-holders are assigned by administrators and users to respective sensitive-object types. In other embodiments, random characters may be applied, or terms selected from lists as pseudonymized-object-holders.

Server 140 provides connection and transmission support for the peer-to-peer connection between participating users of the online conversational content exchange. In embodiments of the present invention, the content exchanged between users is not stored server 140, and in some embodiments, the content exchanged between users is encrypted and decrypted by the user's device, such as computing device 110 and computing device 120. In some embodiments, protection program 400 may operate on server 140, communicatively connected to computing device 110 and computing device 120.

In some embodiments, server 140 can be a web server, a blade server, a desktop computer, a laptop computer, a tablet computer, a netbook computer, or any other programmable electronic computing device capable of receiving, sending, and processing data, and communicating with computing device 110, computing device 120, and other computing devices (not shown) within distributed data processing environment 100 via network 150. In other embodiments, server 140 can represent a virtual computing device operating based on multiple computers as a server system, such as in a cloud computing environment. In another embodiment, server 140 represents a computing system utilizing clustered computers and components (e.g., database server computers, application server computers, etc.) that act as a single pool of seamless resources when accessed within distributed data processing environment 100. Server 140 may include internal and external hardware components, as depicted in more detail and described in FIG. 5.

Figure 2:
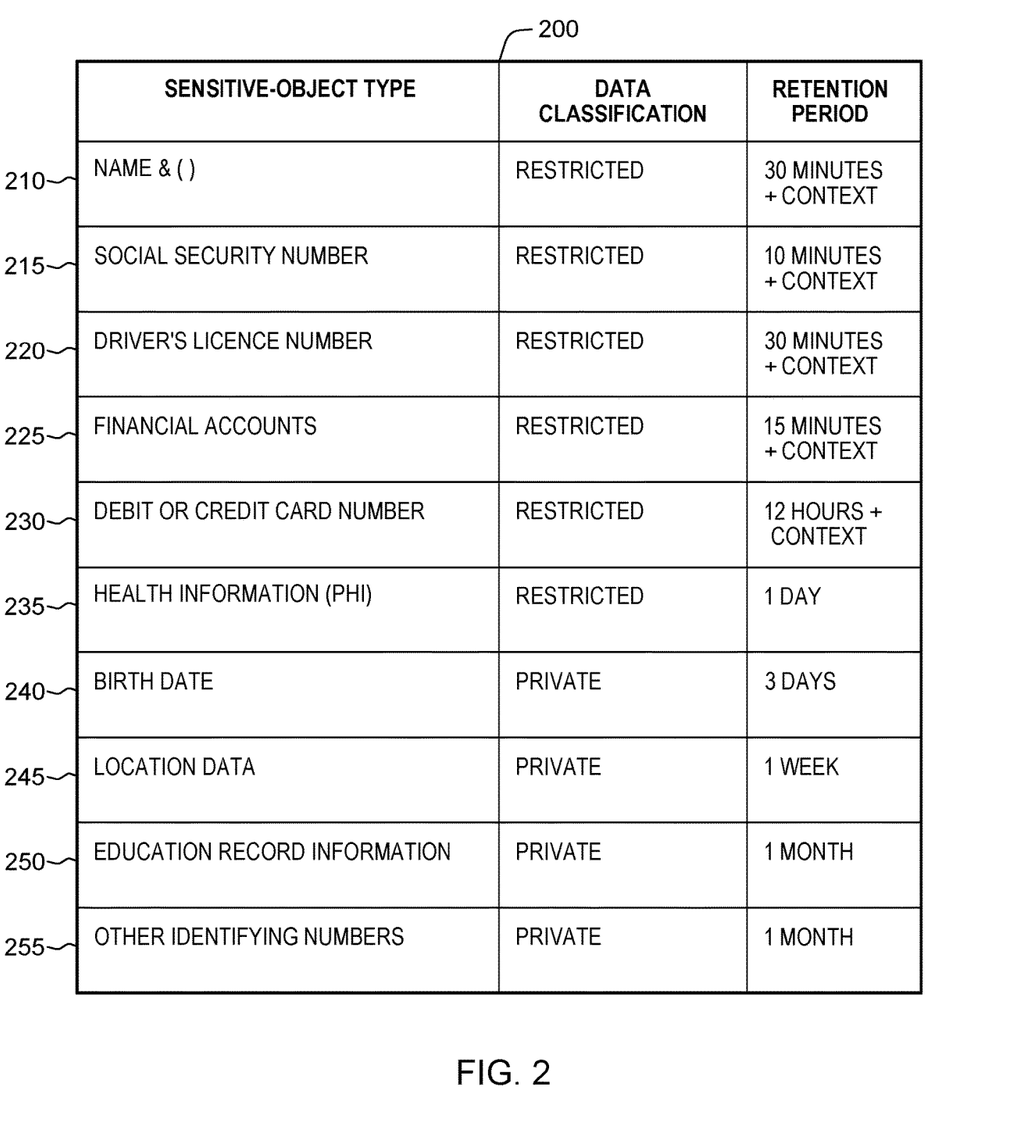
FIG. 2 is a table illustrating an example of components of sensitive-object protective policies, in accordance with embodiments of the present invention.

FIG. 2 depicts table 200 illustrating an example of components of sensitive-object protective policies, in accordance with embodiments of the present invention. Table 200 includes columns listing sensitive-object type, data classification, and retention period. The example components of table 200 define the sensitive-object types, the classification level, and retention period for pseudonymization actions associated with the sensitive-object policies of a user. The components depicted in table 200 are examples to further clarify and illustrate embodiments of the present invention and are not intended to be limiting.

FIG. 2 includes table entry 210 which includes a sensitive-object type of "name & ( )", a data classification of "restricted" and a retention period of "30 minutes+context." In some embodiments of the present invention, table entry 210 is included by an administrator overseeing restricted data classification of sensitive objects and complies with a government or other authority applying to the user associated with the sensitive-object protection policies depicted in table 200. The sensitive-object type "name & ( ) associated with table entry 210 indicates a policy to pseudonymize identified names when the name is associated with other sensitive-object types, which corresponds to the "& ( )" portion. The retention period indicates that within 30 minutes, considering the context of the content, the identified sensitive object in the content exchange between users is pseudonymized, replaced by the pseudonymized-object-holder assigned to the Name+( ) sensitive object. The retention period includes consideration of the context of the content with respect to the instance of sensitive object. The context may include additional text indicating the sensitive object has not been used by the receiving user, is not understood or clear, or may have a time-factor associated with the sensitive object due to the location or other factors associated with the receiving user. The detection of recognized contextual factors, determined by NLP and semantic analysis of the content exchanged during scanning, in some embodiments, alters the retention period to a pre-determined duration (not shown).

FIG. 2 also includes table entries 215, 220, 225, and 230 which include, respectively sensitive-object types social security number, driver's license number, financial accounts, and debit or credit card numbers. The sensitive objects are all classified as restricted, indicating the sensitive-object types comply with authority entities other than the user, and the sensitive objects include retention periods of 10 minutes+context, 30 minutes+context, 15 minutes+context, and 12 hours+context, respectively. The retention times depicted are to demonstrate variations that may be applied and may be edited further based on received feedback and on-going learning of pseudonymize modules 300 and 305. FIG. 2 further includes table entries 235, 240, 245, 250 and 255, which include sensitive-object types, protected health information (PHI), birth date, location data, education record information, and other identifying numbers, respectively. Table entry 235 includes a restricted classification and a retention period of one day without context consideration. Table entries 240, 245, 250, and 255 include a "private" classification, indicating a different classification from sensitive-object types included in administrator provided protection policies. In the example embodiment, the private classification corresponds to sensitive-object types that are input by the user and include variable retention periods until pseudonymization is performed.

Table 200 includes as an example embodiment, two levels of classification of sensitive-object types, restricted and private; however, other sets of sensitive-object protection policies may include only one classification level or may include more than two classification levels. In some embodiments, user-based sensitive-object types are included in the user profile and are editable by the user, and pseudonymize modules 300 and 305 include the user-based input in the sensitive-object policies of the respective user.

Figure 3:
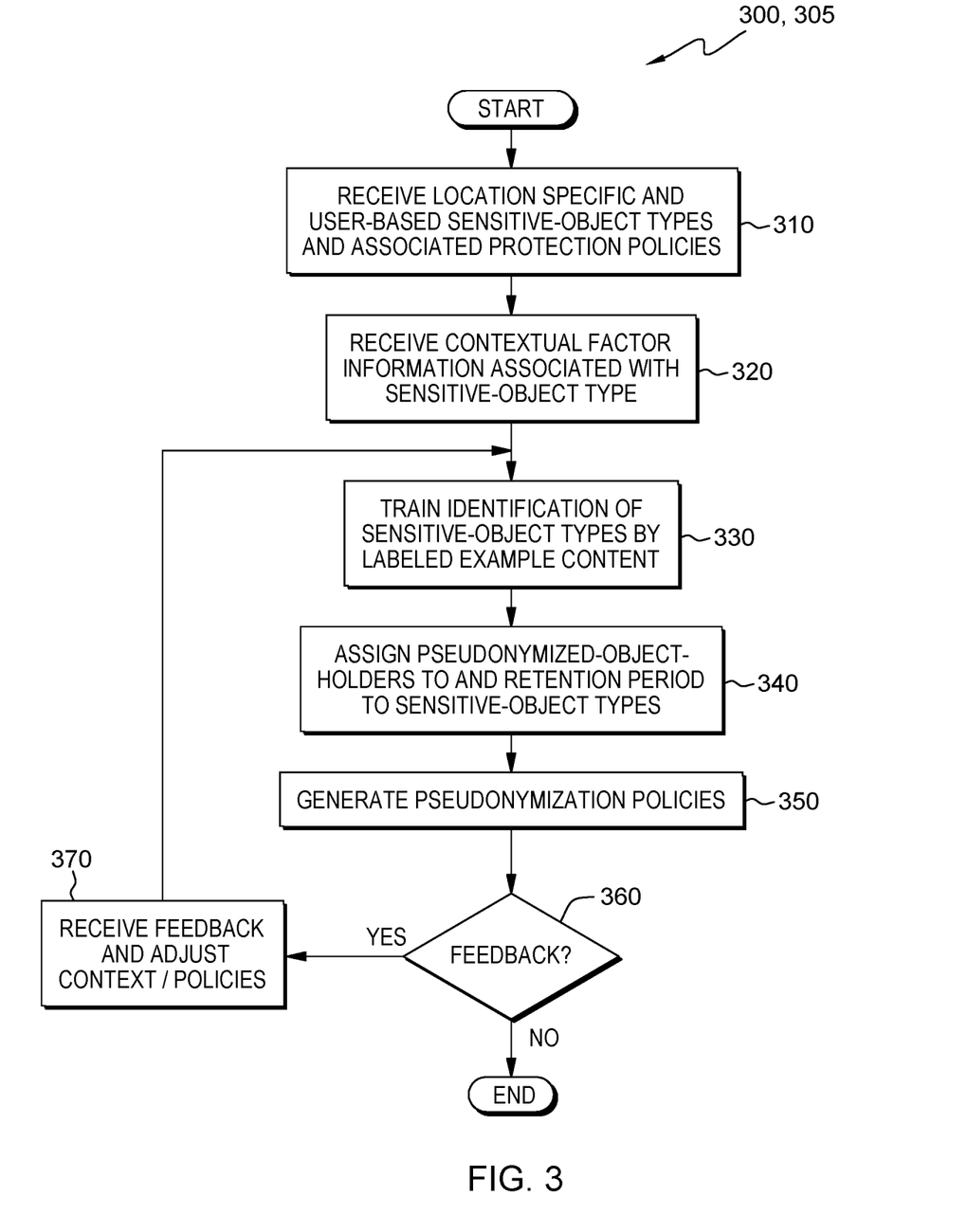
FIG. 3 is a flowchart depicting operational steps of a pseudonymize module, operating in the distributed data processing environment of FIG. 1, in accordance with embodiments of the present invention.

FIG. 3 is a flowchart depicting operational steps of pseudonymize module 300 and pseudonymize module 305, operating in the distributed data processing environment of FIG. 1, in accordance with embodiments of the present invention. Pseudonymize module 300 and pseudonymize module 305 perform similar operations but may differ by the specific components of their respective sensitive-object protection policies, which are based on location and other authorities applying restrictive sensitive-object types. For clarity and simplicity, the details of the operations depicted in FIG. 3 will be described with respect to pseudonymize module 300 below but will apply to both pseudonymize module 300 and pseudonymize module 305.

Pseudonymize module 300 receives location-specific and user-based sensitive-object types and associated protection policies (step 310). In some embodiments of the present invention, local government, service providers, or other authority may include privacy regulations and rules regarding electronic communication data that identify certain sensitive-object types. Regulation and legal sources of sensitive-object types are given a classification in which retention periods are shorter and customizations to the sensitive-object types and retention periods are restricted to a designated administrator. Pseudonymize module 300 receives input of location and other authority specific sensitive-object types with the associated protection policies that include retention periods. Pseudonymize module 300 also receives input from respective users of computing devices operating protection program 400 and pseudonymize module 300. User-based sensitive-object types receive a separate classification enabling editing and customization by the user and include associated protection policies with retention periods defined by the respective user. In some embodiments, users enter preferences of sensitive-object types and corresponding retention period information.

Pseudonymize module 300 receives contextual factor information associated with sensitive-object types (step 320). In some embodiments, retention period actions have a dependence on whether additional terms or phrases are identified as associated with a sensitive-object type, providing a contextual factor or context of the sensitive object. If detected, the context of the sensitive-object type determines the appropriate retention period to apply prior to performing pseudonymization of the sensitive object. Pseudonymize module 300 receives input identifying contextual factor information associated with sensitive-object types and retention period data corresponding to the presence or absence of the contextual factors. For example, a sensitive-object type of a financial account number associated with the owner's name is detected (for example, by protection program 400), during scanning of an exchange of online content. The scanning also determines a contextual factor indicating the account won't be used immediately. The retention period received by authority administrators for a financial account number is set to 1 hour; however, the detection of contextual factors enables the retention period to extend to 24 hours.

Pseudonymize module 300 performs identification training of sensitive-object types by scanning labeled example content (step 330). In some embodiments of the present invention, pseudonymize module 300 iteratively scans a plurality of example content exchanges, including labeled sensitive objects and associates the labeled sensitive-object terms and designated sensitive-object types. Training of pseudonymize module 300 includes machine learning techniques to train the function identifying sensitive objects and associated sensitive-object type, and the trained function is shared, and in some embodiments, updated on a continual basis, with protection program 400. In some embodiments of the present invention, the machine learning techniques apply natural language processing and semantic analysis to recognize terms and associations and enable learning of identification and association of the sensitive objects to a certain sensitive-object type. In a similar fashion, the recognition and association of contextual factors to sensitive-objects types is achieved by supervised machine learning techniques that include labeled contextual factors and associated sensitive-object types.

Pseudonymize module 300 assigns pseudonymized-object-holders to sensitive-object types (step 340). Pseudonymize module 300 includes pseudonymized-object-holders, which are sets of characters used to replace sensitive objects during the performance of pseudonymization. In some embodiments of the present invention, pseudonymize module 300 generates random sets of characters as pseudonymized-object-holders and assigns object-holders to identified sensitive objects. In some embodiments, a particular set of pseudonymized-object-holders is assigned to a sensitive-object type, and a pseudonymized-object-holder from the set is assigned to each sensitive object identified in content exchanges between users. In other embodiments, a pseudonymized-object-holder is a set of specific characters and each additional instance of a pseudonymized-object-holder replacing a sensitive object includes advancing a numeric or alpha character of the pseudonymized-object-holder. For example, a pseudonymized-object-holder may be ABCDEFG111 for a first sensitive object in content exchange, and for a second sensitive object, ABCDEFG112 may be assigned as the pseudonymized-object-holder. In yet other embodiments, an administrator or user performs customizations to pseudonymized-object-holders and assignments the pseudonymized-object-holders to sensitive-object types.

Pseudonymize module 300 generates pseudonymization policies (step 350). Having received sensitive-object types and classifications, contextual factor input, and performed training to identify sensitive objects and contextual factors, as well as assigning pseudonymized-object-holders, pseudonymize module 300 generates sensitive-object protection policies that include associating sensitive objects to specific sensitive-object types, providing a classification level associated with editing and customization permissions, and including retention periods associated with performing pseudonymization which may vary by sensitive-object type. Pseudonymize module 300 assigns the policies to the respective user, for example, pseudonymize module 300 generates pseudonymization policies for the user of computing device 110. In some embodiments, pseudonymize module 300 resides and operates on computing device 110 and the generated pseudonymization policies are available to protection program 400. In other embodiments, pseudonymize module 300 may operate remotely, such as on server 140 and remain communicatively connected to computing device 110.

Pseudonymize module 300 determines whether feedback is available (decision step 360). Feedback from the pseudonymization of sensitive objects is received from the user for user-based policy input, and from an administrator for classification levels of sensitive-object types input based on regulation, laws, or business interests. In some embodiments, the feedback may include additional sensitive-object types, based on changes to regulations or laws, or may be based on user preferences. In some embodiments, the feedback indicates that adjustments are necessary to the existing retention periods associated with certain sensitive-object types. In yet other embodiments, the feedback received may indicate that certain sensitive-object types should be removed from protection policies. For the case in which pseudonymize module 300 determines that no pending feedback is available (step 360, "NO" branch), pseudonymize module 300 ends. For the case in which pseudonymize module 300 determines that pending feedback is available (step 360, "YES" branch), pseudonymize module 300 proceeds to step 370.

Pseudonymize module 300 receives feedback and makes adjustments to protection policies and context factor information (step 370). In some embodiments of the present invention, the feedback received by pseudonymize module 300 is analyzed (for example, by protection program 400) to determine the subject of the feedback and information associated with the pseudonymization action. For example, feedback received may include comments regarding a sensitive-object type of "mobile phone number" and indicate that the sensitive-object type should be added to the protection policies. Pseudonymize module 300 includes the analyzed feedback and inserts the sensitive-object type from feedback in step 330 to train identification of mobile phone numbers and determine a retention period for the sensitive-object type. In some embodiments, subsequent to proceeding and processing through step 330 to iteratively perform scanning a plurality of content exchanges with labeled input, and step 340 assigning pseudonymized-object-holders, as described previously, pseudonymize module 300 generates updated sensitive-object policies that include the new sensitive-object type "mobile phone number."

Figure 4:
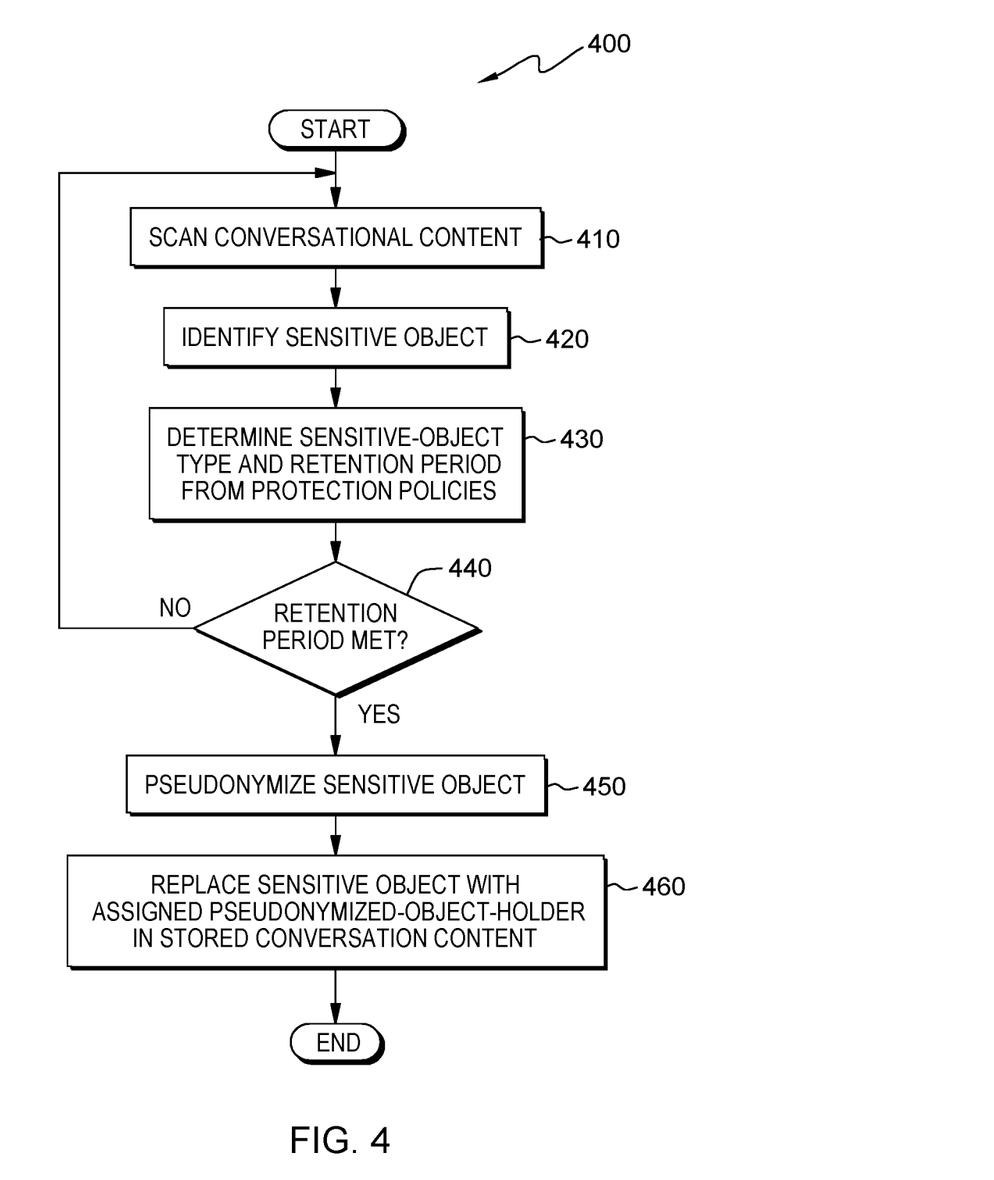
FIG. 4 is a flowchart depicting operational steps of a protection program, operating in the distributed data processing environment of FIG. 1, in accordance with embodiments of the present invention.

FIG. 4 is a flowchart depicting operational steps of protection program 400, operating in the distributed data processing environment of FIG. 1, in accordance with embodiments of the present invention. Protection program 400 scans the conversational content of an online exchange between users of a peer-to-peer application (step 410). In some embodiments of the present invention, protection program 400 performs scanning of the conversational exchange content in real-time as the content is generated by the users. In other embodiments, protection program 400 may perform scanning operations at pre-determined intervals. Online chat applications (apps), such as peer-to-peer apps, receive online content from users operating the same app from respective computing devices. Protection program 400 receives content sent from a user's device and content transmitted to the user's device. Protection program 400 scans the content of the conversational exchange between users connected via the peer-to-peer app.

Protection program 400 identifies sensitive objects within the online content exchange (step 420). Protection program 400 includes sensitive object protection policies generated by pseudonymize module 300 for computing device 110 and pseudonymize module 305 for computing device 120. Protection program 400 receives a trained identification function from pseudonymize module 300 to identify sensitive objects corresponding to sensitive-object types included in the sensitive object protection policies. Protection program 400 identifies terms within the scanned online content exchange that correspond to the sensitive-object types of protection policies. For example, protection program 400 scans conversational content between user 1 and user 2 which includes the content "you can purchase that shirt using my account which already has a Visa® credit card account number 1234-5678-9999 attached to it," ("Visa" is a registered trademark in the United States and other countries worldwide). Protection program 400 identifies the terms "Visa", "credit card account", and the account number "1234-5678-9999" as sensitive objects, based on the training of an identification function performed on pseudonymize module 300, which is a component module of protection program 400.

Protection program 400 determines a sensitive-object type and retention period associated with the identified sensitive objects from the sensitive object protection policies (step 430). Protection program 400 associates the identified sensitive-object terms with the sensitive-object types included in the protection policies for the user. Protection program 400 determines a retention period corresponding to the sensitive-object type by referencing the sensitive object protection policies of the respective user. For example, protection program 400 determines that the terms "Visa", "credit card account", and the account number "1234-5678-9999" identified in the content exchange between two users, user 1 and user 2, correspond to the sensitive-object type "financial accounts", and determines a retention period of 15 minutes and includes the consideration of context of the scanned content exchange (indicated in FIG. 2). Without confirmation of contextual factors identified from the scanning of the content, along with the financial account sensitive objects, protection program 400 performs pseudonymization actions in 15 minutes after identifying the sensitive object and sensitive-object type.

Having determined sensitive-object types and retention periods of identified sensitive objects within the content of the conversational exchange, protection program 400 determines whether the retention period has been met (decision step 440). Protection program 400 tracks a duration of time from the identification of the sensitive-object type and the retention period of sensitive objects included in the scanned content and determines whether a retention period corresponding to an identified sensitive object has expired.

For the case in which protection program 400 determines that the retention period for a sensitive object has not expired (step 440 "NO" branch), protection program 400 proceeds to step 410 and continues to scan conversational content, as described above. For example, protection program 400 identifies the sensitive object "birth date" in the content of the conversational exchange between user 1 and user 2, based on the terms "my" and "birthday" in proximity to a detected date, "Mar. 22, 2004". Protection program 400 determines that the sensitive object protection policies for sensitive-object type "birth date" is associated with a retention period of 3 days. Protection program 400 begins tracking the duration of time and returns to step 410 to continue to scan the conversational exchange for additional sensitive objects.

For the case in which protection program 400 determines that the retention period for an identified sensitive object of the conversational content exchange has expired (step 440, "YES" branch), protection program 400 proceeds to step 450 and performs a pseudonymization action on the identified sensitive object corresponding to the expired retention period, as determined by referencing the sensitive object protection policies associated with the respective user. Protection program 400 continues to track the duration of time from detection and identification of the sensitive object within the content exchanged, and takes action, performing a pseudonymization action corresponding to the protection policies of the respective user's computing device, subsequent to the expiration of the retention period for the specific sensitive object.

For example, protection program 400 determines the content of a conversational exchange between user 1 operating computing device 110 and user 2 operating computer device 120 includes the sensitive-object term "111-22-3344" and recognizes the characters as defining a social security number of a user. Protection program 400 references the protection policies of user 1, for example, and determines that social security number is a sensitive-object type that corresponds to a retention period of 10 minutes and includes consideration of context. Protection program 400 determines that no additional context terms are included in the content exchange and tracks a duration of time for 10 minutes. Subsequent to the expiration of the 10 minute retention period, protection program 400 performs a pseudonymization action on the social security number, exchanging a pseudonymized-object-holder, which was previously established in the sensitive-object protection policies for computing device 110 of user 1, for the sensitive object in the content, which is the social security number.

Protection program 400 replaces the sensitive object in the stored conversational content on the computing device of the user with an assigned pseudonymized-object-holder (step 460). In some embodiments of the present invention, a pseudonymized-object-holder is previously assigned to each sensitive-object type during the configuration of a respective user's sensitive-object protection policies. The pseudonymized-object-holder may be a designated set of characters or may be generated with random characters conforming to a defined format of the sensitive-object type identified. Protection program 400 replaces the identified sensitive object in the content of the conversational exchange with the corresponding pseudonymized-object-holder, subsequent to determining the expiration of the retention period, and ends.

For example, protection program 400 replaces the identified sensitive object "111-22-3344", identified as a social security number within the content of the conversational exchanged between computing device 110 of user 1 and computing device 120 of user 2. Protection program 400 determines that a pseudonymized-object-holder of "ABCDMNOPZ001" is assigned for the first instance of a social security number detected in the content of an exchange, and replaces the social security number "111-22-3344" with the pseudonymized-object-holder "ABCDMNOPZ001" in the stored content of the conversational exchange on both computing device 110 and computing device 120.

If additional users are participating in the online content exchange, protection program 400 replaces the sensitive-object type identified with the assigned pseudonymized-object-holder and according to the retention period, as designated in the most secure pseudonymization action of the combined protection policies of the participants. If the sensitive object identified matches a sensitive-object type of a first user's protection policies (user 1) but is not found in the protection policies of one or more other users participating in the online conversational exchange (user 2 and user 3, for example), then protection program 400 responds to the sensitive object identified by performing the pseudonymization action reflecting the protective policies of user 1 in the stored instances of the content exchange on the computing devices of all participating users (users 1, 2, and 3, for example).

In some embodiments of the present invention, instances in which the identified sensitive object matches a sensitive-object type in both user 1 and user 2 of a two-person conversational exchange but the sensitive-object protection policies of user 1 assigns a retention period of 2 hours, and the sensitive-object protection policies of protection program 400 operating on the computing device of user 2 assigns a retention period of 30 minutes for the same sensitive-object type, protection program 400 performs a pseudonymization action on both computing devices of user 1 and user 2 subsequent to a retention period of 30 minutes. Protection program 400 responds to the identification of sensitive objects and retention periods in accordance with the more secure and protective policies among the participants of the conversational content exchange.

In some embodiments, protection program 400 may perform pseudonymization actions in a rationed format, making some percentage of changes for each instance of a passing unit of time, as depicted in the sensitive-object protection policies of the respective user's computing device. For example, protection program 400 detects multiple sensitive-object types within the context of a conversational exchange between users. Protection program 400 may perform an initial pseudonymization subsequent to a 1-hour retention period expiring, and partially pseudonymize a driver license number identified in the content. Subsequent to another 2 hours of retention period expiring, protection program 400 pseudonymizes a name combined with a credit card number and completes the pseudonymization of the driver's license number. Subsequent to an additional 6 hours of retention period expires, all remaining identified sensitive objects are pseudonymized with assigned pseudonymized-object-holders.

Figure 5:
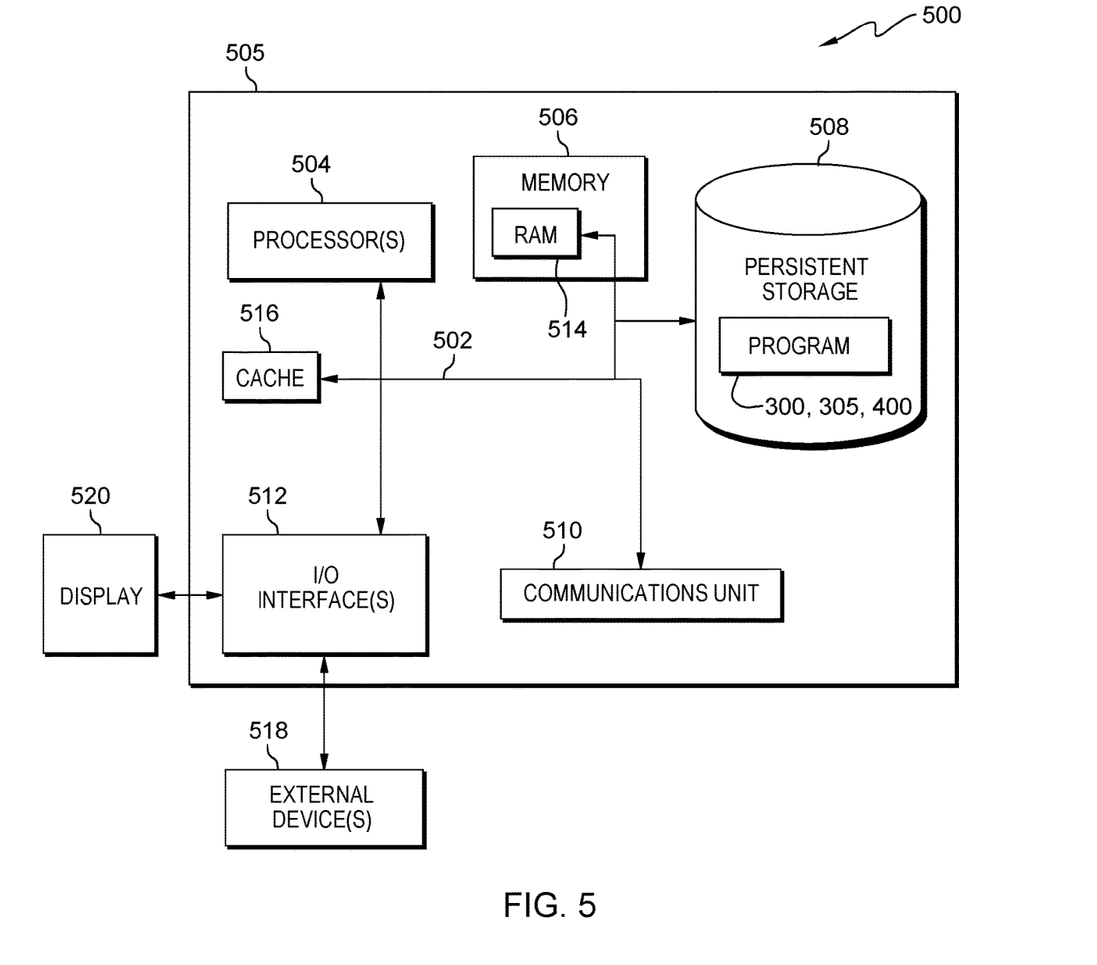
FIG. 5 depicts a block diagram of components of a computing system, including a computing device configured with capability to operationally perform the pseudonymize module of FIG. 3 and the protection program of FIG. 4, in accordance with an embodiment of the present invention.

FIG. 5 depicts a block diagram of components of computing system 500, including computing device 505, configured to include or operationally connect to components depicted in FIG. 1, and capable of performing operational steps of pseudonymize module 300 and pseudonymize module 305 of FIG. 3, and protection program 400 of FIG. 4, in accordance with an embodiment of the present invention, in accordance with an embodiment of the present invention.

Computing device 505 includes components and functional capability similar to components of computing device 110, computing device 120, and server 140 (FIG. 1), in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computing device 505 includes communications fabric 502, which provides communications between computer processor(s) 504, memory 506, persistent storage 508, communications unit 510, an input/output (I/O) interface(s) 512. Communications fabric 502 can be implemented with any architecture designed for passing data and/or control information between processors (such as microprocessors, communications, and network processors, etc.), system memory, peripheral devices, and any other hardware components within a system. For example, communications fabric 502 can be implemented with one or more buses.

Memory 506, cache memory 516, and persistent storage 508 are computer readable storage media. In this embodiment, memory 506 includes random access memory (RAM) 514. In general, memory 506 can include any suitable volatile or non-volatile computer readable storage media.

In one embodiment, pseudonymize module 300, or pseudonymize module 305, as well as protection program 400, are stored in persistent storage 508 for execution by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including resources of distributed data processing environment 100. In these examples, communications unit 510 includes one or more network interface cards. Communications unit 510 may provide communications through the use of either or both physical and wireless communications links. Pseudonymize module 300 or pseudonymize module 305, and protection program 400 may be downloaded to persistent storage 508 through communications unit 510.

I/O interface(s) 512 allows for input and output of data with other devices that may be connected to computing system 500. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention, e.g., pseudonymize module 300 or pseudonymize module 305, and protection program 400 can be stored on such portable computer readable storage media and can be loaded onto persistent storage 508 via I/O interface(s) 512. I/O interface(s) 512 also connects to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for protecting content of online conversation data, the method comprising:
    one or more processors scanning content of an online conversation exchange between a first device and a second device;
    the one or more processors identifying a sensitive object included in the content of the online conversation exchange, based on a sensitive-object protection policy included in respective user profiles of the first device and the second device
    the one or more processors determining that the sensitive-object protection policies included in the respective user profiles differ based on requirements of location and overseeing authority for the first device and the second device
    responsive to determining that the sensitive-object protection policies included in the respective user profiles differ based on requirements of location and overseeing authority for the first device and the second device:
        the one or more processors applying a more secure and protective sensitive-object protection policy among the sensitive-object protection policies included in the respective user profiles to both devices;
    the one or more processors assigning a replacement term to the identified sensitive object according to a sensitive object type of the sensitive-object protection policy included in the respective user profiles; and
    the one or more processors replacing the identified sensitive object in the content of the online conversation exchange between the first device and the second device, on both the first device and the second device, with the replacement term, based on the more secure and protective sensitive-object protection policy among the sensitive-object protection policies included in the respective user profiles, subsequent to an expiration of a pre-determined retention period.

2. The method of claim 1, further comprising:
    the one or more processors determining a type of a sensitive object within the content of the online conversation exchange between the first device and the second device, based on labeled data included in training activity of sensitive-object type identification.

3. The method of claim 1, further comprising:
    the one or more processors including two or more levels of classification of sensitive-object identification in a sensitive-object protection policy of the first device; and
    the one or more processors providing customization of a sensitive-object type in the sensitive-object protection policy of the first device, wherein one level of classification of sensitive-object identification is customizable by a user of the first device.

4. The method of claim 1, further comprising:
    the one or more processors including in sensitive-object protection policies, a retention period associated with a sensitive-object type;
    the one or more processors tracking a duration of time subsequent to detection of the sensitive object; and
    the one or more processors performing a pseudonymization action directed at the sensitive object, subsequent to determining an expiration of the retention period associated with the sensitive-object type of the identified sensitive object.

5. The method of claim 1, wherein the sensitive-object protection policy included in the respective user profiles includes sensitive-object types, classification of the sensitive-object types, and a retention period associated with the sensitive-object types.

6. The method of claim 1, further comprising:
    the one or more processors receiving location-specific sensitive-object types and user-based sensitive-object types;
    the one or more processors receiving classification and retention period information associated respectively with the received location-specific sensitive-object types and the user-based sensitive-object types;
    the one or more processors performing a training function identifying sensitive-object types by iterative processing of labeled example sensitive-object types included in online content exchanges;
    the one or more processors generating a sensitive-object protection policy based on the training function identifying the sensitive-object types; and
    the one or more processors providing the sensitive-object protection policy to the user profile of respective users.

7. The method of claim 1, wherein the sensitive-object protection policy includes a set of policies structured in two or more levels, wherein each level includes identification criteria of sensitive-object types, retention period defining a time duration prior to performing pseudonymization of the identified sensitive object, and criteria for replacement of the sensitive object with a pseudonymized-object-holder as the replacement term of the sensitive object, designated during the pseudonymization.

8. The method of claim 1, wherein a pseudonymization ration is applied to the identified sensitive objects of the conversational exchange making incremental changes to replace the sensitive objects with pseudonyms over a pre-determined period of time.

9. A computer program product for protecting content of online conversation data, the computer program product comprising:
    one or more computer readable storage media; and
    program instructions stored on the one or more computer readable storage media, the program instructions comprising:
        program instructions to scan content of an online conversation exchange between a first device and a second device;
        program instructions to identify a sensitive object included in the content of the online conversation exchange, based on a sensitive-object protection policy included in respective user profiles of the first device and the second device;

program instructions to determine that the sensitive-object protection policies included in the respective user profiles differ, based on requirements of location and overseeing authority for the first device and the second device;

responsive to determining that the sensitive object protection policies included in the respective user profiles differ based on the requirements of location and overseeing authority for the first device and second devices:

program instructions to apply a more secure and protective sensitive-object protection policy among the sensitive-object protections policies included in the respective user profiles to both devices;

program instructions to assign a replacement term to the identified sensitive object according to a sensitive object type of the sensitive-object protection policy included in the respective user profiles; and program instructions to replace the identified sensitive object in the content of the online conversation exchange between the first device and the second device, on both the first device and the second device, with the replacement term based on more secure and protective the sensitive-object protection policy of the sensitive-object protection policies included in the respective user profiles, subsequent to an expiration of a pre-determined retention period.

10. The computer program product of claim 9, further comprising:

program instructions to determine a type of a sensitive object within the content of the online conversation exchange between the first device and the second device, based on labeled data included in training activity of sensitive-object type identification.

11. The computer program product of claim 9, further comprising:

program instructions to include in a sensitive-object protection policy of the first device, two or more levels of classification of sensitive-object identification; and program instructions to provide customization of a sensitive-object type in the sensitive-object protection policy of the first device, wherein one level of classification of sensitive-object identification is customizable by a user of the first device.

12. The computer program product of claim 9, further comprising:

program instructions to include in sensitive-object protection policies, a retention period associated with a sensitive-object type;

program instructions to track a duration of time subsequent to detection of the sensitive object; and program instructions to perform a pseudonymization action directed at the sensitive object, subsequent to determining an expiration of the retention period associated with the sensitive-object type of the identified sensitive object.

13. The computer program product of claim 9, wherein the sensitive-object protection policy included in the respective user profiles includes sensitive-object types, classification of the sensitive-object types, and a retention period associated with the sensitive-object types.

14. The computer program product of claim 9, further comprising:

the one or more processors receiving location-specific sensitive-object types and user-based sensitive-object types;

the one or more processors receiving classification and retention period information associated respectively with the received location-specific sensitive-object types and the user-based sensitive-object types;

the one or more processors performing a training function identifying sensitive-object types by iterative processing of labeled example sensitive-object types included in online content exchanges;

the one or more processors generating a sensitive-object protection policy based on the training function identifying the sensitive-object types; and the one or more processors providing the sensitive-object protection policy to the user profile of respective users.

15. A computer system for protecting content of online conversation data, the computer system comprising:

one or more computer processors;

one or more computer readable storage media; and program instructions stored on the one or more computer readable storage media, the program instructions comprising:

program instructions to scan content of an online conversation exchange between a first device and a second device;

program instructions to identify a sensitive object included in the content of the online conversation exchange, based on a sensitive-object protection policy included in respective user profiles of the first device and the second device;

program instructions to determine that the sensitive-object protection policies included in the respective user profiles differ based on requirements of location and overseeing authority for the first device and the second device;

responsive to determining that the sensitive-object protection policies included in the respective user profiles differ based on requirements of location and overseeing authority for the first device and the second device:

program instructions to apply a more secure and protective sensitive-object protection policy among the sensitive-object protection policies included in the respective user profiles to both devices;

program instructions to assign a replacement term to the identified sensitive object according to a sensitive object type of the sensitive-object protection policy included in the respective user profiles; and program instructions to replace the identified sensitive object in the content of the online conversation exchange between the first device and the second device, on both the first device and the second device, with the replacement term based on the more secure and protective sensitive-object protection policy of the sensitive-object protection policies included in the respective user profiles, subsequent to an expiration of a pre-determined retention period.

16. The computer system of claim 15, wherein program instructions apply a pseudonymization ration to the identified sensitive objects of the conversational exchange making incremental changes to replace the sensitive objects with pseudonyms over a predetermined period of time.

17. The computer system of claim 15, further comprising:

program instructions to determine a type of a sensitive object within the content of the online conversation exchange between the first device and the second device, based on labeled data included in training activity of sensitive-object type identification;

program instructions to include two or more levels of classification of sensitive-object type identification in a sensitive-object protection policy of the first device;

program instructions to provide customization of a sensitive-object type of one level of classification of sensitive-object identification by a user of the first device; and program instructions to provide customization of one level of classification of sensitive-object identification by an assigned administrator including sensitive-object types and retention periods complying with regulations.

18. The computer system of claim 15, wherein the sensitive-object protection policy included in the respective user profiles includes sensitive-object types, classification of the sensitive-object types, and a retention period associated with the sensitive-object types.

19. The computer system of claim 15, further comprising:
program instructions to receive location-specific sensitive-object types and user-based sensitive-object types;
program instructions to receive classification and retention period information associated respectively with the received location-specific sensitive-object types and the user-based sensitive-object types; and
program instructions to perform a training function identifying sensitive-object types by iterative processing of labeled example sensitive-object types included in online content exchanges;
program instructions to generate a sensitive-object protection policy based on the training function identifying the sensitive-object types; and
program instructions to provide the sensitive-object protection policy to the user profile of respective users.

20. The computer system of claim 15, wherein the sensitive-object protection policy includes a set of policies structured in two or more levels, wherein each level includes identification criteria of sensitive-object types, retention period defining a time duration prior to performing pseudonymization of the identified sensitive object, and the criteria for replacement of the sensitive object with a pseudonymized-object-holder as the replacement term, designated during the pseudonymization.

* * * * *